Nov. 12, 1929.  H. F. WENTZLOFF  1,735,821
FRUIT CUTTER AND PICKER
Filed March 10, 1926
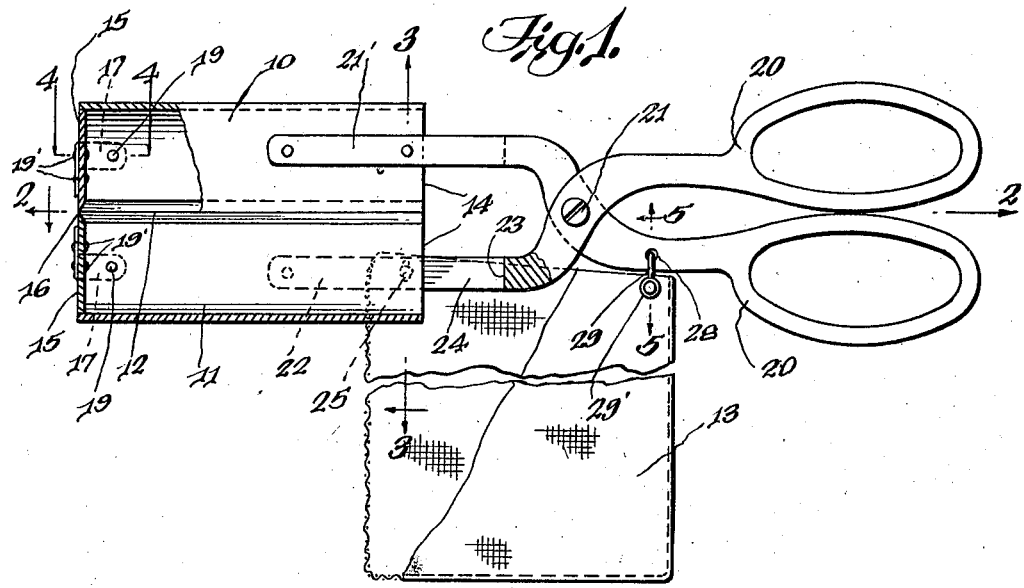
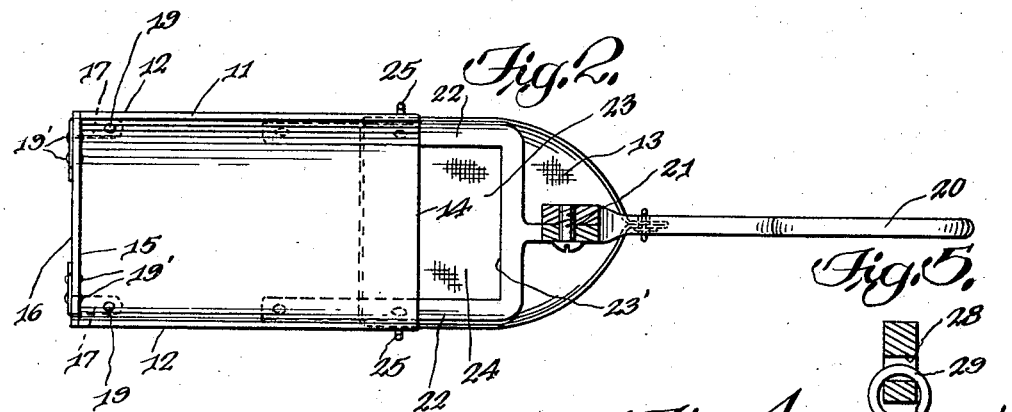
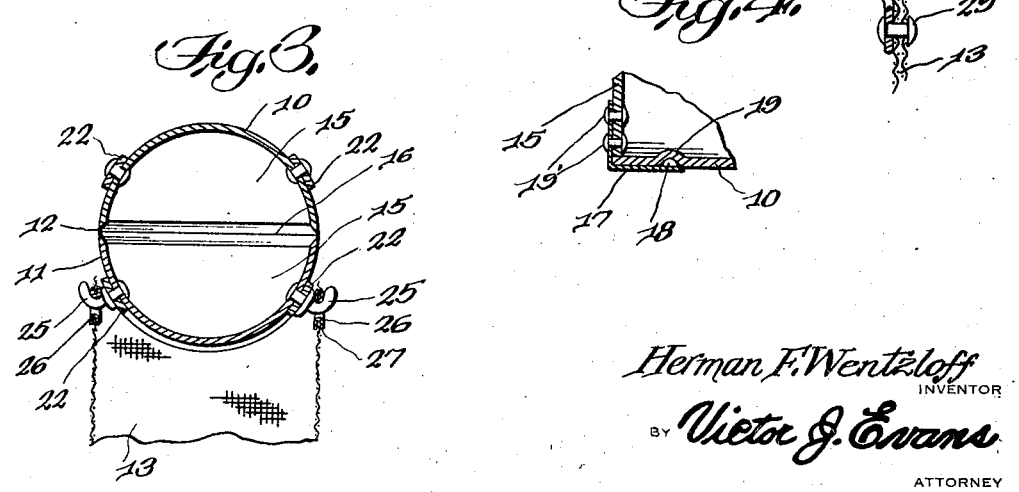
Herman F. Wentzloff
INVENTOR
BY Victor J. Evans
ATTORNEY Patented Nov. 12, 1929

1,735,821

UNITED STATES PATENT OFFICE

HERMAN F. WENTZLOFF, OF CHICAGO, ILLINOIS

FRUIT CUTTER AND PICKER

Application filed March 10, 1926. Serial No. 93,677.

This invention relates to certain novel improvements in fruit cutters and pickers and has for its principal object the provision of an improved construction of this character which will be highly efficient in use and economical in manufacture.

Among the various objects of the invention is the production of a device of this character wherein there is provided a simple combination and arrangement of parts for expeditiously separating the fruit bearing stems from the branches carrying the same and for catching the separated fruit bearing stems and directing them to a receptacle adapted to receive the same.

Other objects will appear hereinafter.

The invention consists in the novel combination and arrangement of parts to be hereinafter described and claimed.

The invention will be best understood by reference to the accompanying drawing showing the preferred form of construction of my invention and in which:

Fig. 1 is a part side elevational and sectional view of the invention.

Fig. 2 is a sectional detail view of the same taken substantially on line 2—2 of Fig. 1.

Fig. 3 is a fragmentary sectional detail view of the same taken substantially on line 3—3 of Fig. 1.

Fig. 4 is a sectional detail view taken substantially on line 4—4 of Fig. 1.

Fig. 5 is a sectional detail view taken substantially on line 5—5 of Fig. 1.

As will be apparent from the description herein to follow, the invention is designed for the purpose of separating fruit bearing stems, such for example stems bearing cherries, from the branches of a tree carrying the same, the resulting advantages of the invention residing in the fact that the fruit can be gathered in larger quantities by the use of the invention than by hand.

To accomplish this object I provide opposite cutter jaws 10 and 11 shaped semicircularly in cross section so that when they are disposed in the position illustrated in Fig. 1, with their cutting edges 12 in abutment, a cylindrical enclosure is provided for guiding the fruit bearing stems thus separated to a flexible bag 13, as will be evident from the description herein to follow.

These cutting jaws are open at one end as at 14 and closed at the opposite ends by substantially circularly shaped end plates 15 having cooperating cutting edges 16. These end plates are detachably secured to the cutter jaws through the medium of spring clips 17 having lateral protuberances 18 formed thereon adapted for snapping engagement in depressed recesses 19 formed in the cutter jaws as best illustrated in Fig. 4. These spring clips are secured to the cutter jaws through the medium of securing elements 19′ illustrated in the form of rivets. These end plates are removable for the purpose of permitting renewal thereof or for sharpening purposes.

The operation of the cutter jaws is accomplished through the medium of handle portions 20 pivotally connected together as at 21 for scissor action. The handle portions 20 are formed as an integral part of supporting arms 21′ and 22 bifurcated as at 23 to receive the cutter jaws 10 and 11 as best illustrated in Fig. 1. The open ends of the cutter jaws are disposed in spaced relation with the bight portions 23′ of the bifurcated portions to provide an opening 24 for the passage of the separated fruit bearing stems from the cutter jaw 11 into the bag 13. This opening will vary in size, in manufacture of the device, as will be found necessary to accommodate the various sizes and shapes of fruit bearing stems.

The fruit passing through this opening is caught by the bag 13 which is of proper size and this bag is intended to be detachably carried by the cutter jaws and handle portions in the following manner.

Secured to the cutter jaw 11, on opposite sides thereof, are hook members 25 adapted for hooked engagement with eyelets 26 secured to the bag 13 as at 27. Formed in the lowermost handle portion 20 is an opening 28 which is adapted to accommodate a hook 29 carried by the bag 13 and secured thereto as at 29′. To detachably connect the bag to the cutter jaws and lowermost handle portion the eyelets 27 are mounted for hooked engagement with the hook members 25 and the hook 29 is positioned through the opening 28 so as to be supported by the lower of the handle portions 20. In this position it will be noted that the bag 13 is disposed in the position to receive the fruit bearing stems separated from the branches by operation of the cutter jaws 10 and 11.

The operation of the device is apparent from the description herein and it is pointed out at this time that I provide a device for separating fruit bearing stems which can be manufactured at an economical cost and one which can be expeditiously operated for the purpose.

While I have shown and described the preferred form of my invention, it is to be understood that various changes and alterations may be resorted to during manufacture without departing from the spirit of the invention or the scope of the appended claims.

The invention having been set forth, what I claim as new and useful is:

1. A device of the class described including cutter jaws having cooperating cutting edges, means for operating the cutter jaws including handle portions pivotally connected together for scissor action and having bifurcated end portions carrying the cutter jaws with the opened ends of the cutter jaws disposed in spaced relation with the bight portions of the bifurcated portions, and a receptacle carried by one of the cutter jaws and one of the handle portions in a position to receive matter passing through the opening provided between said ends of the cutter jaws and the bight portions of the bifurcated portions.

2. A device of the class described including cutter jaws having cooperating cutting edges formed substantially semicircular in cross section to provide a cylindrical passage when the cutting edges of the cutter jaws are disposed in abutment, means for operating the cutter jaws including handle portions pivotally connected together for scissor action and having bifurcated end portions carrying the cutter jaws with the opened ends of the cutter jaws disposed in spaced relation with the bight portions of the bifurcated portions, and a receptacle carried by one of the cutter jaws and one of the handle portions in a position to receive matter passing through the opening provided between said ends of the cutter jaws and the bight portions of the bifurcated portions.

3. A device of the class described including cutter jaws having cooperating cutting edges, end plates for the cutter jaws, means for detachably connecting the end plates to the cutter jaws, means for operating the cutter jaws including handle portions pivotally connected together for scissor action and having bifurcated end portions carrying the cutter jaws with the opened ends of the cutter jaws disposed in spaced relation with the bight portions of the bifurcated portions, and a receptacle carried by one of the cutter jaws and one of the handle portions in a position to receive matter passing through the opening provided between said ends of the cutter jaws and the bight portions of the bifurcated portions.

4. A device of the class described including cutter jaws having open corresponding end portions, end plates closing the opposite corresponding end portions, said end plates having cooperating cutting edges, means for detachably securing the end plates to the cutter jaws, means for operating the cutter jaws, and means carried by one of the cutter jaws and the operating means for receiving matter cut by the cutter jaws.

5. A device of the class described including a scissor structure embodying a handle portion and bifurcated jaw portions, semi-cylindrical members carried by said bifurcated jaw portions, said semi-cylindrical members being adapted when engaged, to provide a cylindrical passage, cooperating cutter blades removably secured to said cylindrical members at the outer end thereof, and a receiver supported by one arm of one of said bifurcated jaw portions and the handle portion thereof, fruit cut by said cutter blades being adapted to be directed into said receiver by said cylindrical passage.

In testimony whereof I affix my signature.

HERMAN F. WENTZLOFF.